(12) United States Patent
Birbara et al.

(10) Patent No.: US 7,759,275 B2
(45) Date of Patent: Jul. 20, 2010

(54) SORBENT SYSTEM FOR WATER REMOVAL FROM AIR

(75) Inventors: Philip J. Birbara, West Hartford, CT (US); Timothy A. Nalette, West Stafford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 206 days.

(21) Appl. No.: 11/775,361

(22) Filed: Jul. 10, 2007

(65) Prior Publication Data

US 2009/0018011 A1    Jan. 15, 2009

(51) Int. Cl.
  B01J 31/00    (2006.01)
  B01J 27/24    (2006.01)
  B01J 20/22    (2006.01)
  B01J 20/26    (2006.01)
  B01D 53/14    (2006.01)
  B01D 53/56    (2006.01)
  B01D 53/04    (2006.01)
  B01D 59/26    (2006.01)
  C01B 17/16    (2006.01)
  C01B 31/20    (2006.01)
  C01B 5/00     (2006.01)

(52) U.S. Cl. .......... 502/159; 502/162; 502/200; 502/401; 502/402; 423/229; 423/230; 423/580.1; 95/90; 95/139

(58) Field of Classification Search .......... 502/159, 502/162, 200, 400–402; 423/229, 230, 580.1; 95/90, 139
See application file for complete search history.

(56) References Cited

U.S. PATENT DOCUMENTS

| | | | |
|---|---|---|---|
| 3,491,031 A | | 1/1970 | Stoneburner |
| 4,770,862 A | * | 9/1988 | Chu et al. .......... 423/229 |
| 4,810,266 A | | 3/1989 | Zinnen |
| 4,999,175 A | | 3/1991 | Vansant |
| 5,376,614 A | | 12/1994 | Birbara |
| 5,492,683 A | | 2/1996 | Birbara |
| 5,620,940 A | | 4/1997 | Birbara |
| 5,681,503 A | | 10/1997 | Nalette |
| 5,876,488 A | | 3/1999 | Birbara |
| 6,364,938 B1 | | 4/2002 | Birbara |
| 6,670,304 B2 | | 12/2003 | Chang |
| 6,908,497 B1 | | 6/2005 | Sirwardane |
| 7,288,136 B1 | * | 10/2007 | Gray et al. .......... 95/139 |
| 2008/0293976 A1 | * | 11/2008 | Olah et al. .......... 568/698 |

FOREIGN PATENT DOCUMENTS

| | | | |
|---|---|---|---|
| JP | 2009-018302 | * | 1/2009 |
| WO | 2008/021700 | * | 2/2008 |

OTHER PUBLICATIONS

"Performance of immobilized tertiary amine solid sorbents for the capture of carbon dioxide," M. L. Gray et al. International Journal of Greenhouse Gas Control 2 (2008), pp. 3-8.*

* cited by examiner

*Primary Examiner*—Patricia L Hailey
(74) *Attorney, Agent, or Firm*—Carlson, Gaskey & Olds, P.C.

(57) ABSTRACT

A sorbent system includes a porous polymer support and a sorbent within the porous polymer support. For example, the sorbent includes a tertiary amine, such as triethanolamine.

14 Claims, 1 Drawing Sheet

SORBENT SYSTEM FOR WATER REMOVAL FROM AIR

BACKGROUND OF THE INVENTION

This invention relates to sorbent systems and, more particularly, to sorbent systems for removal of water from air.

Conventional sorbents, such as zeolitic molecular sieves, silica gel, or clay, are commonly known and used for removal of water and/or carbon dioxide from air. Although effective, these conventional types of sorbents have several drawbacks that limit widespread use. For example, conventional sorbents strongly bind the adsorbed water, which may make regeneration difficult or too inefficient to be practical. For example, the binding energy (i.e., heat of adsorption) of water is about 1800 btu/lb for a zeolite and 1300 btu/lb for silica gel. After reaching full adsorption capacity, the sorbent may be heated in a regeneration step at a relatively high temperature, such as 150° C. (302° F.) to 190° C. (374° F.), to overcome the binding energy and recover a portion of the adsorption capacity. Because of the elevated binding energies, complete desorption of the adsorbed water may not occur. The sorbent may then be less effective in subsequent adsorbing cycles because of residual adsorbed water. Alternatively, the sorbent may be discarded and replaced with new sorbent. Thus, conventional sorbents may require significant heat energy or replacement expenses.

Accordingly, a sorbent system that provides water removal and relatively low regeneration temperatures is needed. This invention addresses those needs while avoiding the shortcomings and drawbacks of the prior art.

SUMMARY OF THE INVENTION

An example sorbent system includes a porous polymer support and a sorbent within the porous polymer support. For example, the sorbent includes a tertiary amine, such as triethanolamine.

In another aspect, the sorbent system includes a porous polymer support and a sorbent within the porous polymer support, where the sorbent has a regeneration temperature that is less than 140° F.

An example method of regenerating the sorbent system includes the step of desorbing substantially all of the water from the sorbent at a temperature of less than about 140° F.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
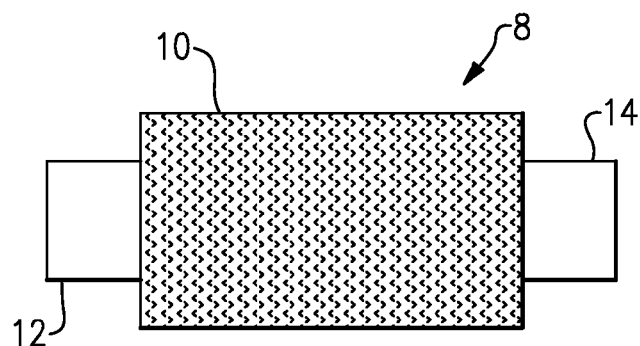
FIG. 1 illustrates an example sorbent bed.

FIG. 1 illustrates selected portions of an example sorbent system 8 for removing water vapor from air within a habitable environment, for example. In this example, the sorbent system 8 includes a sorbent bed 10 having an inlet 12 for receiving an input air flow and an outlet 14 for discharging purified air. Although a particular arrangement is shown, it is to be understood that the sorbent system 8 of the disclosed examples is not limited to the illustrated configuration or suggested uses.

Figure 2:
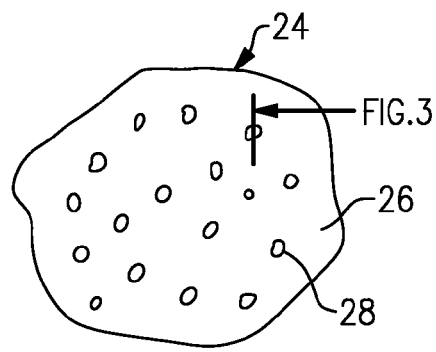
FIG. 2 illustrates an example pellet used in the sorbent bed.

Referring to FIG. 2, the sorbent bed 10 includes a plurality of pellets 24. Each of the pellets 24 includes a porous polymer support 26 having a plurality of interconnected pores 28. The pellets 24 may be of any size or shape that is suitable for use in the sorbent bed 10 or other sorbent system.

Figure 3:
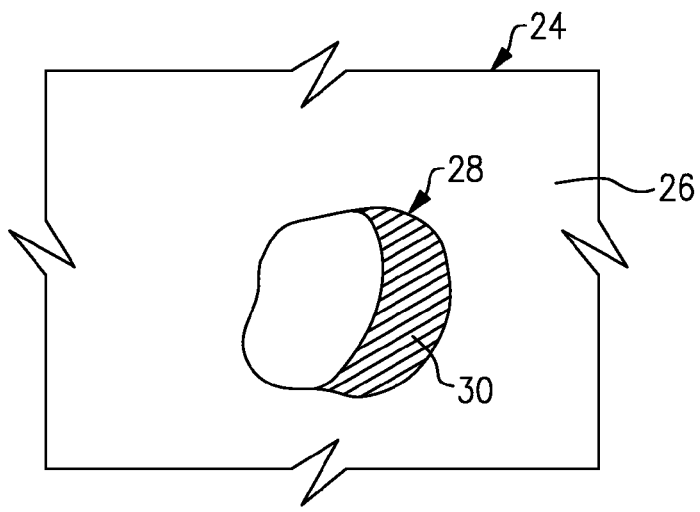
FIG. 3 is a portion of the example pellet illustrating a porous polymer support having immobilized sorbent.

FIG. 3 illustrates a cross-section through a portion of the pellet 24 and one of the pores 28. The pores 28 include a sorbent 30 immobilized therein. For example, known techniques may be used to immobilize the sorbent 30 within the pores 28, such as wet impregnation using a solvent carrier mixed with the liquid sorbent 30.

The sorbent 30 comprises a tertiary amine chemical structure for adsorbing water vapor from a passing air stream. In one example, the tertiary amine is triethanolamine, which contains functional sites for adsorbing water at three alcohol sites (of the unit molecule). Thus, triethanolamine is more effective for water removal than many previously used sorbents having fewer functional sites. In at least one example, the tertiary amine sorbent 30 is the only sorbent used in the pellets 24, to target near complete removal of water. It is to be understood that the tertiary amine sorbent 30 may include impurities that do not affect the sorbent properties or substances that are unmeasured or undetectable. In other examples, the pores 28 may additionally include one or more other sorbents.

The material of the porous polymer support 26 and the size and distribution of the pores 28 are tailored for removing water vapor at relatively low water vapor partial pressures. For example, the porous polymer support 26 comprises polymethylmethacrylate, which is capable being manufactured with a desired total pore volume, average pore radius, and total surface area that is tailored for removing the water vapor from the air. In one example, the polymethylmethacrylate is a polymeric sorbent resin, such as Diaion® HP2MG supplied by Mitsubishi Chemical. Other types of polymethylmethacrylate resins may also be used. In some examples, the resin may be washed to remove unwanted substances within the pores.

In a further example, the polymethylmethacrylate of the porous polymer support 26 has specifically tailored characteristics for mechanical integrity and promoting water removal. For example, the porous polymer support 26 comprises a total pore volume of about 0.25 to 0.40 $cm^3/cm^3$, an average pore radius of about 10 nm to 25 nm, and a total surface area of about 400 to 1000 $m^2/g$. The average pore radius provides the benefit of allowing the sorbent 30 to deeply penetrate into the pellets 24 through the pores 28 such that each pellet 24 can contain a relatively high amount of the sorbent 30. The term "about" as used in this description relative to a given characteristic refers to possible variation, such as measurement variation or normally accepted variations or tolerances in the art, for example.

The sorbent 30 may be loaded within each of the pellets 24 in a selected amount, depending on a desired capacity for removing water. In one example, the sorbent 30 is present in an amount of about 0.7 to 1.0 wt/wt of the support 26. In some examples, under the above loading conditions, the sorbent bed 10 reduces a water partial pressure of 10 Torr at a temperature of 20° C. to less than 0.2 Torr, which corresponds to a water adsorption capacity of about 15 wt/wt % to 25 wt/wt %.

The tertiary amine of the sorbent 30 provides a lower water binding energy than previously used sorbents. The lower binding energy corresponds to a lower required temperature to desorb water from the sorbent 30 during regeneration. Furthermore, substantially all of the water can be desorbed from the sorbent 30 in a regeneration step. For example, the substantially all of the adsorbed water can be removed from the sorbent 30 using a regeneration temperature that is less than 140° F. (60° C.). In a further example, the regeneration temperature is about 122° F. (50° C.).

The above relatively low regeneration temperatures provide the benefit of allowing removal of substantially all of the adsorbed water from the sorbent 30 during a regeneration step. Desorbing substantially all of the water from the sorbent 30 increases the water adsorption capacity in subsequent adsorption cycles and facilitates water adsorption at low water partial pressures for the nearly total removal of water from the air. The pellets 24 can be heated at the regeneration temperature for a predetermined period of time to remove nearly all of the absorbed water. The time may vary, depending on the amount of sorbent 30 used, size of the pores 28, and size of the pellets 24, for example. In one example, the time may be determined experimentally.

Optionally, in addition to the use of temperature, a water vapor partial pressure in an atmosphere of the pellets 24 or sorbent bed 8 during regeneration may be lowered below ambient relative humidity to promote desorption and reduce the regeneration time, for example.

Verification of the degree of water removal can be estimated or determined experimentally. For example, substantially all of the adsorbed water has been desorbed when the sorbent bed 10 (or the pellets 24) is exposed to an air stream having no water, and the concentration of water in the air stream does not detectably increase. There may also be other ways of determining the degree of water removal.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A sorbent system comprising:
    a porous polymer support having an average pore radius of about 10-25 nanometers; and
    a sorbent within the porous polymer support, the sorbent including a tertiary amine present in the porous polymer support in an amount of about 0.7 to 1.0 wt/wt of the support.

2. The sorbent system as recited in claim 1, wherein the porous polymer support comprises polymethylmethacrylate.

3. The sorbent system as recited in claim 1, wherein the porous polymer support comprises a pore volume of about 0.25 to 0.40 cm$^3$/cm$^3$.

4. The sorbent system as recited in claim 1, wherein the porous polymer support comprises a total surface area including pores of about 400 to 1000 m$^2$/g.

5. The sorbent system as recited in claim 1, wherein the tertiary amine comprises triethanolamine.

6. The sorbent system as recited in claim 1, wherein the sorbent consists essentially of the tertiary amine.

7. The sorbent system as recited in claim 1, wherein the porous polymer support comprises a plurality of pellets within a sorbent bed.

8. A sorbent system comprising:
    a porous polymer support having an average pore radius of about 10-25 nanometers; and
    a sorbent within the porous polymer support, the sorbent having a regeneration temperature of less than 140° F. and wherein the sorbent is present within the porous polymer support in an amount of about 0.7 to 1.0 wt/wt of the support.

9. The sorbent system as recited in claim 8, wherein the regeneration temperature is about 122° F.

10. The sorbent system as recited in claim 8, wherein the sorbent comprises a tertiary amine.

11. The sorbent system as recited in claim 10, wherein the tertiary amine comprises triethanolamine.

12. A method of regenerating a sorbent system having a porous polymer support and a sorbent within the porous polymer support having adsorbed water, the method comprising:
    a. desorbing substantially all of the water from the sorbent at a regeneration temperature that is less than 140° F., wherein the porous polymer support comprises pores having an average pore radius of about 10-25 nanometers and the sorbent is present in the porous polymer support in an amount of about 0.7 to 1.0 wt/wt of the support.

13. The method as recited in claim 12, wherein the regeneration temperature is about 122° F.

14. The method as recited in claim 13, further comprising reducing a water vapor partial pressure to a pressure that is less than ambient relative humidity to desorb substantially all of the water from the sorbent.

\* \* \* \* \*